United States Patent
Onodera (10) Patent No.: US 10,746,319 B2
(45) Date of Patent: Aug. 18, 2020

(54) VALVE DEVICE

(71) Applicant: DENSO CORPORATION, Kariya, Aichi-pref. (JP)

(72) Inventor: Hirofumi Onodera, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/385,011

(22) Filed: Apr. 16, 2019

(65) Prior Publication Data

US 2019/0353274 A1   Nov. 21, 2019

(30) Foreign Application Priority Data

May 15, 2018   (JP) .................................. 2018-93501

(51) Int. Cl.
  *F16K 31/50*   (2006.01)
  *F02M 25/08*   (2006.01)
  *F16K 31/04*   (2006.01)

(52) U.S. Cl.
  CPC ....... *F16K 31/508* (2013.01); *F02M 25/0836* (2013.01); *F02M 25/0872* (2013.01); *F16K 31/047* (2013.01)

(58) Field of Classification Search
  CPC ...... F16K 31/508; F16K 31/047; F16K 27/02; F02M 25/0836; F02M 25/0872
  See application file for complete search history.

(56) References Cited

U.S. PATENT DOCUMENTS

| | | | |
|---|---|---|---|
| 5,390,703 A * | 2/1995 | Tengesdal | F16K 1/44 137/629 |
| 9,470,161 B2 * | 10/2016 | Akita | F02D 41/003 |
| 2016/0146159 A1 | 5/2016 | Kimoto et al. | |
| 2016/0186700 A1 | 6/2016 | Nishiura et al. | |
| 2017/0356394 A1 | 12/2017 | Murai | |

* cited by examiner

*Primary Examiner* — Eric Keasel
(74) *Attorney, Agent, or Firm* — Nixon & Vanderhye P.C.

(57) ABSTRACT

A valve device includes a valve housing, a valve member, an engaging portion, a valve member side thread portion, a driving portion side thread portion, a driving portion, a first biasing member, a second biasing member, and a second biasing member support portion. The valve housing has a plurality of through holes through which a fluid flows, a valve seat formed around the first through holes of the plurality of through holes, and a valve chamber that communicates the plurality of through holes. In the valve device, the first through hole is formed on the movement axis of the valve member, and the second through hole is formed in a radially outward direction of the valve member. A distance between the second biasing member support portion and the valve seat is longer than a distance between the valve member and the valve seat.

7 Claims, 9 Drawing Sheets

VALVE DEVICE

CROSS REFERENCE TO RELATED APPLICATION

The present application is based on Japanese Patent Application No. 2018-93501 filed on May 15, 2018, disclosure of which is incorporated herein by reference.

TECHNICAL FIELD

The present disclosure relates to a valve device.

BACKGROUND

Conventionally, there is known a valve device that is capable of opening and closing a through hole by reciprocating a valve member by utilizing rotational torque output from a stepping motor.

SUMMARY

The present disclosure provides a valve device including a valve housing, a valve member, an engaging portion, a valve member side thread portion, a driving portion side thread portion, a driving portion, a first biasing member, a second biasing member, and a second biasing member support portion.

The valve housing has a plurality of through holes through which a fluid flows, a valve seat formed around the first through holes of the plurality of through holes, and a valve chamber that communicates the plurality of through holes.

In the valve device of the present disclosure, the first through hole is formed on the movement axis of the valve member, and the second through hole is formed in a radially outward direction of the valve member. In the valve device of the present disclosure, a distance between the second biasing member support portion and the valve seat is longer than a distance between the valve member and the valve seat.

DETAILED DESCRIPTION

Hereinafter, multiple embodiments of the present disclosure will be explained with reference to the drawings. In the following embodiments, the same reference numerals are given to such portions, which are the same or similar to each other, in order to avoid a repeated explanation.

First Embodiment

Figure 1:
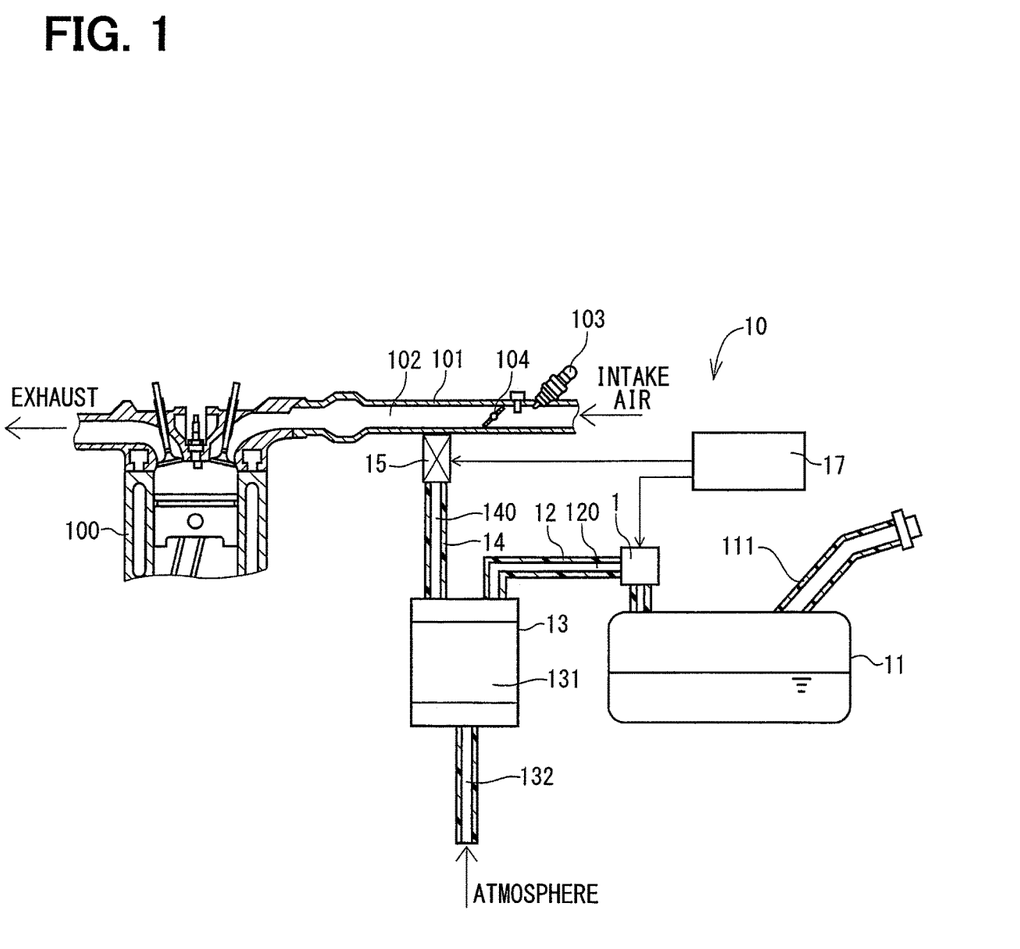
FIG. 1 is a schematic diagram of an evaporated fuel processing apparatus to which a valve device according to a first embodiment is applied.

An evaporated fuel processing system 10 using a valve device 1 according to a first embodiment of the present disclosure is shown in FIG. 1. The evaporated fuel processing system 10 includes a fuel tank 11, the valve device 1, a canister 13, a purge valve 15, an electronic control unit 17 (the ECU 17) and so on. In the evaporated fuel processing system 10, the canister 13 absorbs and collects fuel vapor generated in the fuel tank 11. The canister 13 purges the collected fuel vapor into an intake air passage 102 of an intake air pipe 101 connected to an internal combustion engine 100 as an "internal combustion engine".

The fuel tank 11 stores fuel to be supplied to the engine 100. The fuel tank 11 is connected to the canister 13 by a purge pipe 12. The purge pipe 12 forms a purge passage 120 capable of communicating an inside of the fuel tank 11 and an inside of the canister 13 with each other. The fuel tank 11 is provided with a fuel supply pipe 111 capable of supplying fuel into the fuel tank 11.

The valve device 1 is provided in the purge pipe 12. The valve device 1 communicates the inside of the fuel tank 11 and the inside of the canister 13 with each other or blocks off the communication between them. The valve device 1 communicates the inside of the fuel tank 11 and the inside of the canister 13 when supplying fuel from the outside to the inside of the fuel tank 11 via the fuel supply pipe 111. In the present embodiment, when the fuel is supplied to the fuel tank 11, the valve device 1 opens a valve so as to communicate the inside of the fuel tank 11 and the inside of the canister 13 in order to absorb and collect the fuel vapor in the fuel tank 11. The detailed configuration of the valve device 1 will be described later.

The canister 13 includes a canister absorbent 131 for absorbing fuel vapor generated in the fuel tank 11. The canister 13 is connected to the intake air pipe 101 via a purge pipe 14 forming a purge passage 140.

The purge valve 15 is provided in the purge pipe 14. The purge valve 15 communicates the inside of the canister 13 and the intake air passage 102 with each other or blocks off the communication between them.

The ECU 17 is composed of a CPU serving as computing means, a microcomputer having a RAM and a ROM as a storage means, and so on. The ECU 17 is electrically connected to the valve device 1 and the purge valve 15. The ECU 17 opens and closes the valve device 1 according to a traveling state of an automotive vehicle, and controls the communication or interruption between the inside of the fuel tank 11 and the inside of the canister 13. Further, the ECU 17 opens and closes the purge valve 15 according to the travelling state of the automotive vehicle. The fuel absorbed in the canister absorbent 131 is discharged into air, which flows into the canister 13 via an atmospheric passage 132 provided in the canister 13. The air and the fuel discharged from the canister absorbent 131 flow together and they are supplied into the intake air passage 102 via the purge passage 140. The fuel from the canister 13 is supplied to the intake air passage 102 at a downstream side of a fuel injection valve 103 and a throttle valve 104.

Figure 2:
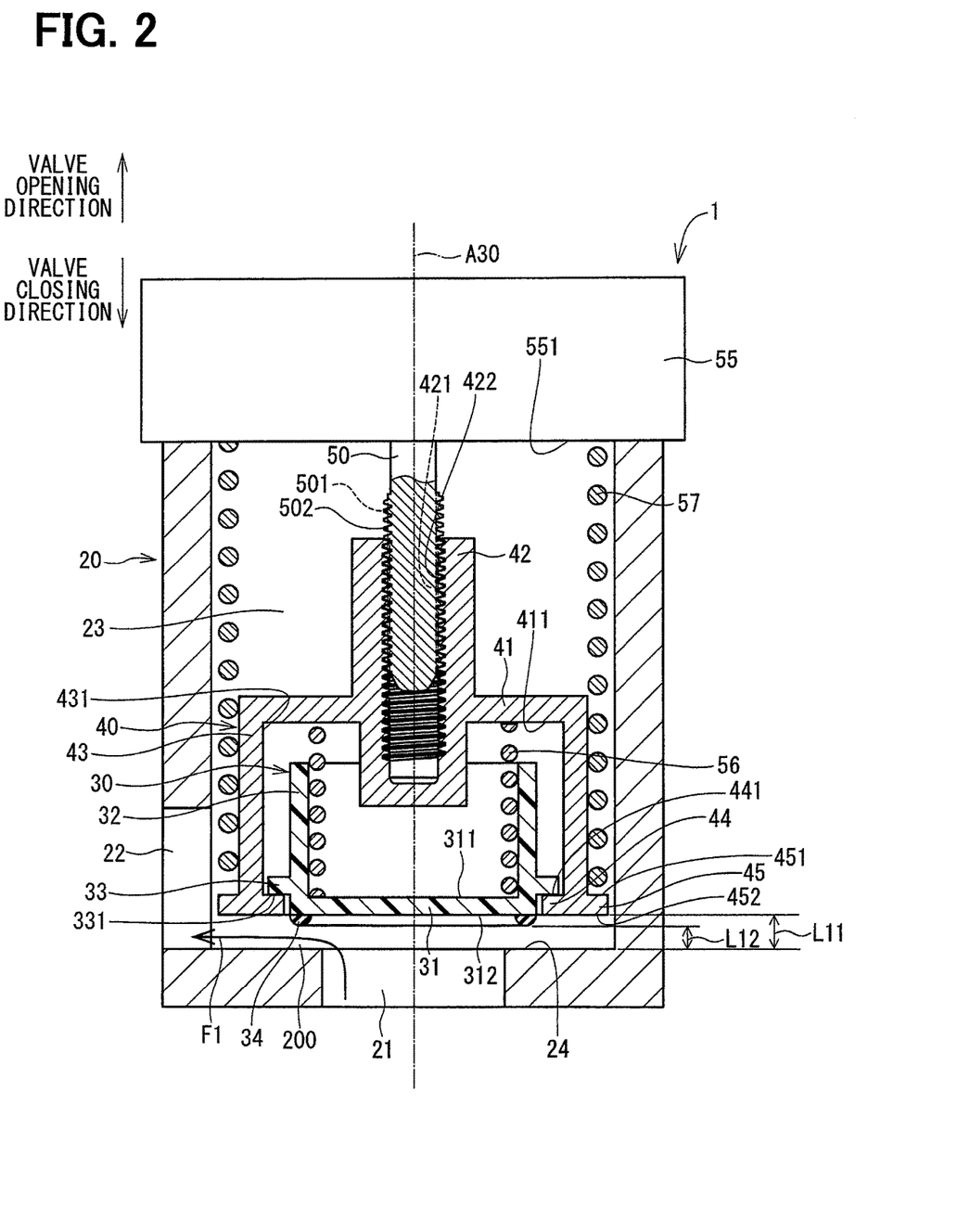
FIG. 2 is a cross-sectional view showing the valve device according to the first embodiment.

A detailed configuration of the valve device 1 will be explained with reference to FIG. 2. The valve device 1 includes a valve housing 20, a valve member 30, a guide member 40, a shaft 50 as a "driving portion side thread portion", an electric motor 55 as a "driving portion", a first coil spring 56 as a "first biasing member", and a second coil spring 57 as a "second biasing member". In FIG. 2, a direction in which the valve member 30 moves so that the valve member 30 moves away from a valve seat 24 is defined as a "valve opening direction", and a direction in which the valve member 30 moves so that the valve member 30 abuts on the valve seat 24 is defined as a "valve closing direction".

The valve housing 20 is made of metal and formed in a box shape. The valve housing 20 is provided in the purge pipe 12. The valve housing 20 has a fuel tank side inlet port 21 as "through hole" and "first through hole", a canister side outlet port 22 as "through hole" and "second through hole", a valve chamber 23, and the valve seat 24.

The fuel tank side inlet port 21 is formed on a lower side of the valve housing 20 in the drawing sheet of FIG. 2. The fuel tank side inlet port 21 is formed on a movement axis A30 of the valve member 30 substantially parallel to a central axis of the valve housing 20. The fuel tank side inlet port 21 is communicated to the inside of the fuel tank 11 via the purge passage 120.

The canister side outlet port 22 is formed on the left side of the valve housing 20 in the drawing sheet of FIG. 2 and is formed in the radially outward direction of the valve member 30 as seen from the movement axis A30 of the valve member 30. The canister side outlet port 22 is located near a gap 200 formed between the valve member 30 and the valve seat 24 when the valve member 30 separates from the valve seat 24. The canister side outlet port 22 is communicated to the inside of the canister 13 via the purge passage 120.

The valve chamber 23 is formed so that the fuel tank side inlet port 21 and the canister side outlet port 22 can communicate with each other. As shown in FIG. 2, the valve chamber 23 accommodates the valve member 30, the guide member 40 and the shaft 50.

The valve seat 24 is formed in a part of an inner wall surface of the valve chamber 23, which is formed at an outer periphery of the fuel tank side inlet port 21. When the valve seat 24 and the valve member 30 come into contact with each other, the fuel tank side inlet port 21 and the canister side outlet port 22 are blocked. When the valve seat 24 and the valve member 30 are separated from each other, the fuel tank side inlet port 21 and the canister side outlet port 22 communicate with each other. When the fuel tank side inlet port 21 and the canister side outlet port 22 communicate with each other, fuel vapor generated in the fuel tank 11 passes through the valve housing 20, that is, through the fuel tank side inlet port 21, the valve chamber 23 and the canister side outlet port 22, and flows into the canister 13.

The valve member 30 is provided so as to reciprocate along the movement axis A30 in the valve chamber 23. The valve member 30 is formed in a substantially bottomed tubular shape, and has a valve member bottom portion 31, a valve member cylindrical portion 32, a flange portion 33, and a seal portion 34 as "one end portion". In the present embodiment, the valve member bottom portion 31, the valve member cylindrical portion 32, and the flange portion 33 are integrally formed from resin.

The valve member bottom portion 31 is a disk-shaped portion and is provided so as to be substantially perpendicular to the movement axis A30.

The valve member cylindrical portion 32 is a cylindrical part of the valve member 30 and connected to a valve opening side end surface 311 (an upper side end surface 311) of the valve member bottom portion 31. The first coil spring 56 (explained below) is accommodated in a radial inside space of the valve member cylindrical portion 32.

The flange portion 33 is an annular portion provided on the radially outer side of the valve member cylindrical portion 32. The flange portion 33 is formed so as to protrude in a radial outward direction from the valve member cylindrical portion 32.

The seal portion 34 is provided on a valve closing side end surface 312 (a lower side surface 312) of the valve member bottom portion 31. The seal portion 34 is made of an elastic material. The seal portion 34 can contact the valve seat 24.

The guide member 40 is a member arranged at a radial outside and an axial upper side position (a valve opening side position) of the valve member 30. The guide member 40 includes a guide bottom portion 41, a guide side thread portion 42 as a "valve member side thread portion", a guide cylindrical portion 43, an inside projecting portion 44 as an "engaging portion", and a guide side spring support portion 45 as a "second biasing member support portion". In the present embodiment, the guide bottom portion 41, the guide side thread portion 42, the guide cylindrical portion 43, the inside projecting portion 44, and the guide side spring support portion 45 are integrally formed. The guide member 40 is movably accommodated in the valve chamber 23, so that the guide member 40 is movable relative to the valve housing 20 in the axial direction.

The guide bottom portion 41 is a disk-shaped portion and is located at an axial upper side of the valve member 30 in the valve opening direction. The guide bottom portion 41 is provided so as to be substantially perpendicular to the movement axis A30 of the valve member 30. An end surface 411 on the valve closing direction side of the guide bottom portion 41 supports an end portion of the first coil spring 56 (explained later) on the valve opening direction side.

The guide side thread portion 42 is a bottomed tubular portion provided on the movement axis A30. The guide side thread portion 42 is provided so as to penetrate substantially the center of the guide bottom portion 41. The guide side thread portion 42 has a female thread 422 as a "valve member side thread" on an inner wall surface 421.

The guide cylindrical portion 43 is a cylindrical portion provided at an outer periphery of the guide bottom portion 41. The guide cylindrical portion 43 extends from the guide bottom portion 41 in an axial downward direction (in the valve closing direction). The guide cylindrical portion 43 is located at a radial outward position of the valve member cylindrical portion 32 of the valve member 30 and the flange portion 33 thereof. The guide cylindrical portion 43 has an inside projecting portion 44 and the guide side spring support portion 45. The guide cylindrical portion 43 guides a reciprocating movement of the valve member 30.

The inside projecting portion 44 is an annular projecting portion formed on a radial inside wall surface 431 of the guide cylindrical portion 43. The inside projecting portion 44 is formed so as to protrude in a radial inward direction from the radial inside wall surface 431 of the guide cylindrical portion 43. The inside projecting portion 44 has an engagement surface 441 that can engage with a valve seat side end surface 331 as the "end surface on the valve seat side of the valve member" on the axial downward direction side (the valve closing direction side) of the flange portion 33.

The guide side spring support portion 45 is an annular projecting portion formed at a radial outside of the guide cylindrical portion 43. The guide side spring support portion 45 is provided at an end portion on the valve closing direction side of the guide cylindrical portion 43. The guide side spring support portion 45 supports an upper side end of a second coil spring 57 (that is, an axial end on the side of the valve closing direction).

The shaft 50 is a so-called feed thread and is rotatably inserted into the guide side thread portion 42 with respect to the guide side thread portion 42. The shaft 50 has a male thread 502 as a "driving side thread" that can be threaded to the female thread 422 of the guide side thread portion 42 and that is formed on an outer wall surface 501 on the radially outer side.

The electric motor 55 is provided on an upper side of the guide bottom portion 41, that is, on the side of the valve opening direction. The electric motor 55 is fixed to the valve housing 20 in such a way that a relative movement of the electric motor 55 with respect to the valve housing 20 is not allowed. The electric motor 55 is connected to the shaft 50 and outputs a rotational torque capable of rotating the shaft 50 according to a command signal output from the ECU 17.

The first coil spring 56 is accommodated in the valve member 30. The first coil spring 56 is interposed between the end surface 311 of the valve member 30 and the end surface 411 of the guide bottom portion 41. The end portion on the axial lower side (on the valve closing direction side) of the first coil spring 56 contacts the end surface 311 and the end portion on the axial upper side (on the valve opening direction side) of the first coil spring 56 contacts the end surface 411. The first coil spring 56 urges the valve member 30 in the valve closing direction, that is, the direction in which the valve member 30 and the valve seat 24 are in contact.

The second coil spring 57 is provided at a radial outward side of the guide member 40. The second coil spring 57 is interposed between an end surface 451 of the guide side spring support portion 45 and an end surface 551 of the electric motor 55. The end portion on the axial lower side (on the valve closing direction side) of the second coil spring 57 contacts the end surface 451 on the valve opening direction side, and the end portion on the axial upper side (on the valve opening direction side) of the second coil spring 57 contacts the end surface 551 on the valve closing direction side. The second coil spring 57 urges the guide member 40 in the valve closing direction, that is, the direction in which the guide member 40 approaches the valve seat 24. Thereby, a backlash between the female thread 422 and the male thread 502 is absorbed.

In the valve device 1 which is in a valve opening state as shown in FIG. 2, a distance L11 between the valve seat 24 and an end surface 452 of the guide side spring support portion 45 on the valve closing direction side is longer than a distance L12 between the seal portion 34 of the valve member 30 and the valve seat 24.

An operation of the above valve device 1 will be explained. From the valve closed state in which the seal portion 34 and the valve seat 24 are in contact with each other, the electric motor 55 is driven to rotate the shaft 50. In the present embodiment, for example, in a case that the shaft 50 is rotated in a clockwise direction when viewing the shaft 50 from the side of the electric motor 55, a relative position between the male thread 502 and the female thread 422 is changed in such a way that the guide member 40 is moved with respect to the shaft 50 in the valve opening direction. When the guide member 40 is moved with respect to the shaft 50 in the valve opening direction, the engagement surface 441 of the inside projecting portion 44 is axially brought into contact with the valve seat side end surface 331 of the flange portion 33. When the guide member 40 is further moved in the valve opening direction while the engagement surface 441 and the valve seat side end surface 331 are in contact with each other, the valve member 30 is correspondingly moved in the valve opening direction. As a result, the seal portion 34 is separated from the valve seat 24, and the fuel tank side inlet port 21 and the canister side outlet port 22 communicate with each other via the valve chamber 23.

On the other hand, in a case that the shaft 50 is rotated in an anti-clockwise direction when viewing the shaft 50 from the side of the electric motor 55, the relative position between the male thread 502 and the female thread 422 is changed in such a way that the guide member 40 is moved with respect to the shaft 50 in the valve closing direction from the position in which the seal portion 34 is separated from the valve seat 24. When the guide member 40 is moved in the valve closing direction with respect to the shaft 50, the valve member 30 engaged with the inside projecting portion 44 is also moved in the valve closing direction. As a result, the seal portion 34 of the valve member 30, which is biased in the valve closing direction by the first coil spring 56, is brought into contact with the valve seat 24. The fuel tank side inlet port 21 and the canister side outlet port 22 are thereby blocked.

In the valve device 1 according to the first embodiment, the guide side spring support portion 45 that supports the end portion on the valve closing direction side of the second coil spring 57 is configured in such manner that the distance L11 between the end surface 452 on the valve closing direction side and the valve seat 24 is longer than the distance L12 between the seal portion 34 of the valve member 30 and the valve seat 24. As a result, the fuel vapor flowing from the fuel tank side inlet port 21 toward the canister side outlet port 22 flows smoothly without colliding with the second coil spring 57 and the guide side spring support portion 45 (see a dotted line F1 in FIG. 2). Thereby it is possible to reduce a pressure loss of the fuel vapor. Therefore, in the first embodiment, it is possible to flow a relatively large flow rate of fuel vapor with a comparatively small movement amount of the valve member 30, so that the controllability can be improved.

In the valve device 1 according to the first embodiment, it is possible to flow a relatively large flow rate of fuel vapor with a comparatively small movement amount of the valve member 30, so that the responsiveness of the valve device 1 can be improved.

In the valve device 1 according to the first embodiment, it is possible to flow a relatively large flow rate of fuel vapor with a comparatively small movement amount of the valve member 30, so that the rotation of the shaft 50 by the electric motor 55 can be relatively reduced. Thus, in the first embodiment, the power consumption of the electric motor 55 can be reduced.

Second Embodiment

A valve device 2 according to a second embodiment of the present disclosure will be explained with reference to FIG. 3. The position where the "second biasing member support portion" in the second embodiment is provided is different from that in the first embodiment.

The valve device 2 of the second embodiment includes the valve housing 20, the valve member 30, a guide member 60, the shaft 50, the electric motor 55, the first coil spring 56, the second coil spring 57 and so on.

The guide member 60 is the member arranged at the radial outside and the axial upper side position (the valve opening side position) of the valve member 30. The guide member 60 has a guide bottom portion 41, a guide side thread portion 42, the guide cylindrical portion 43, an inner projecting portion 44, and a guide side spring support portion 65 as a "second biasing member support portion". In the present embodiment, the guide bottom portion 41, the guide side thread portion 42, the guide cylindrical portion 43, the inside projecting portion 44, and the guide side spring support portion 65 are integrally formed. The guide member 60 is movably accommodated in the valve chamber 23, so that the guide member 60 is movable relative to the valve housing 20 in the axial direction.

The guide side spring support portion 65 is an annular projecting portion formed at the radial outside of the guide cylindrical portion 43. As shown in FIG. 3, the guide side spring support portion 65 is provided substantially at the center of the guide cylindrical portion 43 in the direction along the movement axis A30. In the guide side spring support portion 65, an end surface 651 on the valve opening direction side supports the end portion of the second coil spring 57 on the valve closing direction side.

Figure 3:
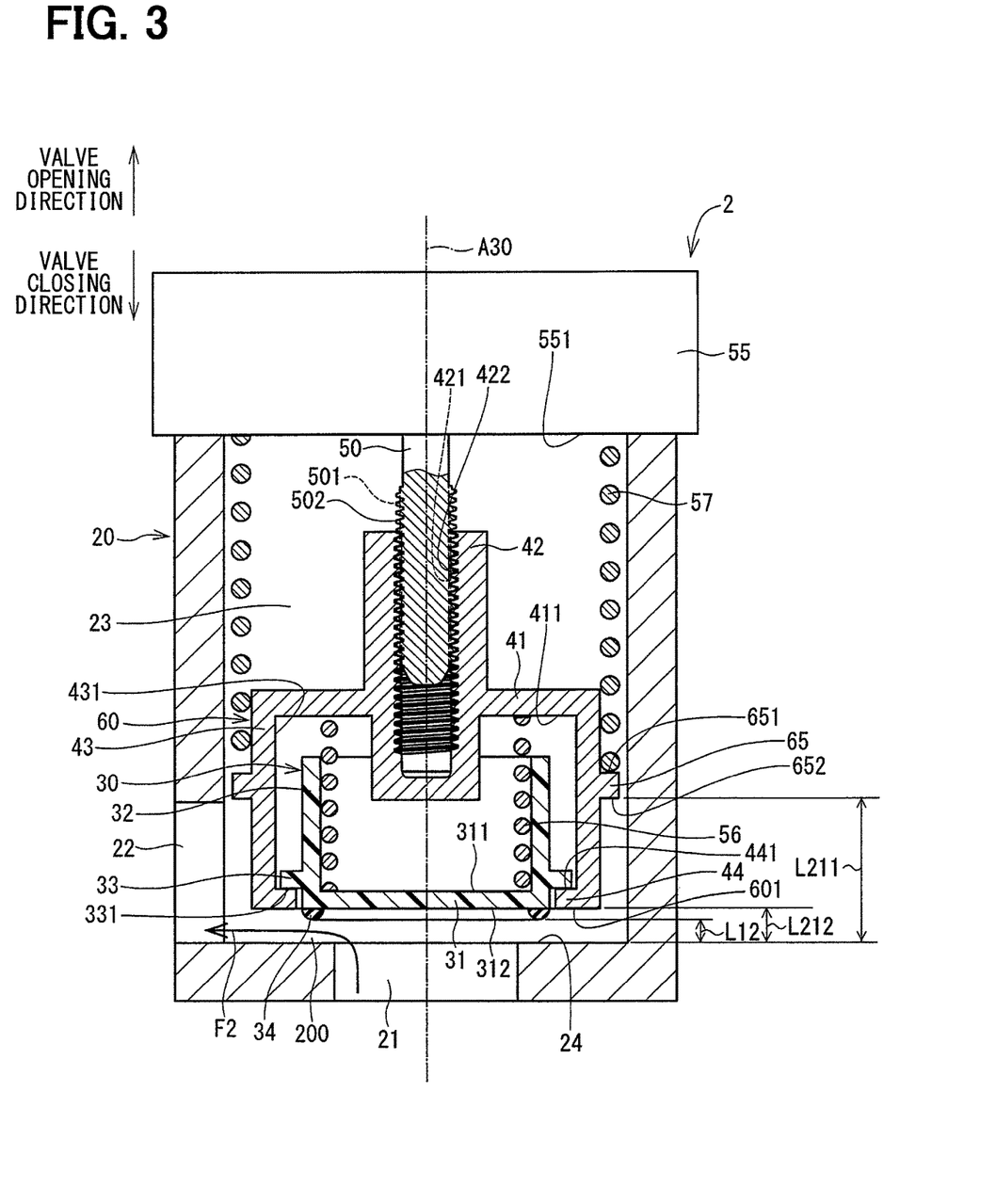
FIG. 3 is a cross-sectional view of a valve device according to a second embodiment.

In the valve device 2 which is in a valve opening state, as shown in FIG. 3, a distance L211 between the valve seat 24 and an end surface 652 of the guide side spring support portion 65 on the valve closing direction side is longer than the distance L12 between the seal portion 34 and the valve seat 24. A distance L212 between an end surface 601 of the guide member 60 on the valve closing direction side and the valve seat 24 is longer than the distance L12 between the seal portion 34 and the valve seat 24.

In the valve device 2 according to the second embodiment, the guide side spring support portion 65 that supports the end portion of the second coil spring 57 on the valve closing direction side is provided substantially at the center of the guide cylindrical portion 43 in the direction along the movement axis A30. Therefore, the distance L211 between the end surface 652 on the valve closing direction side and the valve seat 24 is longer than the distance L12 between the seal portion 34 and the valve seat 24. The guide member 60 is formed such that the distance L211 between the end surface 601 on the valve closing direction side and the valve seat 24 is longer than the distance L12 between the seal portion 34 and the valve seat 24. Accordingly, in the second embodiment, the fuel vapor flowing from the fuel tank side inlet port 21 toward the canister side outlet port 22 flows smoothly without colliding with the second coil spring 57 and the guide side spring support portion 65 (see, a dotted line F2 in FIG. 3). Therefore, the same effect as that of the first embodiment is exerted.

Third Embodiment

A valve device 3 according to a third embodiment will be described with reference to FIG. 4. In the third embodiment, the shape of the "second biasing member support portion" is different from that of the first embodiment.

The valve device 3 of the third embodiment includes the valve housing 20, the valve member 30, a guide portion 70, the shaft 50, the electric motor 55, the first coil spring 56, the second coil spring 57 and so on.

The guide portion 70 is a portion arranged at the radial outside and the axial upper side position (the valve opening side position) of the valve member 30. The guide portion 70 has a guide bottom portion 41, a guide side thread portion 42, the guide cylindrical portion 43, the inside projecting portion 44 and a guide side spring support portion 75 as a "second biasing member support portion". In the present embodiment, the guide bottom portion 41, the guide side thread portion 42, the guide cylindrical portion 43, the inside projecting portion 44, and the guide side spring support portion 75 are integrally formed. The guide member 60 is movably accommodated in the valve chamber 23, so that the guide member 60 is movable relative to the valve housing 20 in the axial direction.

The guide side spring support portion 75 is an annular projecting portion formed at a radial outside of the guide side cylindrical portion 43. As shown in FIG. 4, the guide side spring support portion 75 is provided at an end portion of the guide cylindrical portion 43 on the valve closing direction side. In the guide side spring support portion 75, the end portion of the second coil spring 57 on the valve closing direction side is supported by an end surface 751 on the valve opening direction side. As shown in FIG. 4, an end surface 752 on the valve closing direction side is formed to be separated from the inner wall surface of the valve housing 20, which is flush with the valve seat 24 as it goes away from the fuel tank side inlet port 21. In the present embodiment, the end surface 752 on the valve closing direction side is formed to be apart from the valve seat 24 at a constant rate.

Figure 4:
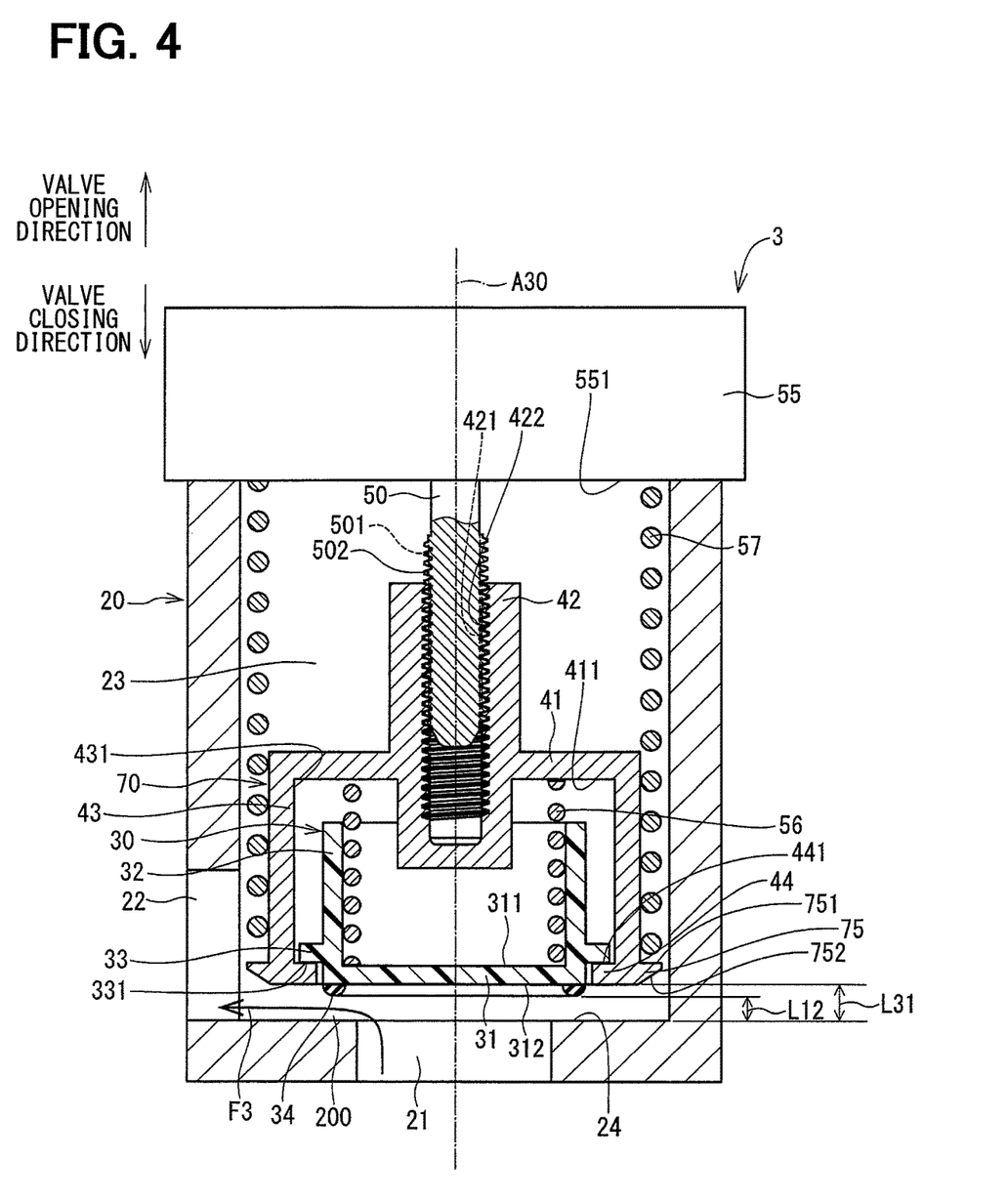
FIG. 4 is a cross-sectional view of a valve device according to a third embodiment.

In the valve device 3 in the valve opening state shown in FIG. 4, a distance L31 between the end surface 752 of the guide side spring support portion 75 and the valve seat 24 is longer than the distance L12 between the seal portion 34 and the valve seat 24.

In the valve device 3 according to the third embodiment, the guide side spring support portion 75 that supports the end portion of the second coil spring 57 on the valve closing direction side is formed such that the distance L31 between the end surface 752 on the valve closing direction side and the valve seat 24 is longer than the distance L12 between the seal portion 34 and the valve seat 24. Accordingly, in the third embodiment, the fuel vapor flowing from the fuel tank side inlet port 21 toward the canister side outlet port 22 smoothly flows without colliding with the second coil spring 57 and the guide side spring support portion 75 (see, the dotted line F3 in FIG. 4). The same effects as that of the first embodiment are exerted.

In the valve device 3 according to the third embodiment, the guide side spring support portion 75 is formed so as to separate from the inner wall surface of the valve housing 20 which is flush with the valve seat 24 as the end surface 752 on the valve closing direction side is separated from the fuel tank side inlet port 21. In the third embodiment, since the fuel vapor flowing from the fuel tank side inlet port 21 toward the canister side outlet port 22 flows more smoothly, the pressure loss of the fuel vapor can be further reduced.

Fourth Embodiment

A valve device 4 according to the fourth embodiment will be described with reference to FIG. 5. In the fourth embodiment, a position where the "second biasing member" and the "second biasing member support portion" are provided is different from that in the first embodiment.

The valve device 4 of the fourth embodiment includes the valve housing 20, the valve member 30, a guide member 80, the shaft 50, the electric motor 55, the first coil spring 56, the second coil spring 57 and so on.

The guide member 80 is the unit arranged at the radial outside and the axial upper side position (the valve opening side position) of the valve member 30. The guide member 80 includes a guide bottom portion 81 as a "second biasing member support portion", the guide side thread portion 42, the guide cylindrical portion 43, and the inside projecting portion 44. In the present embodiment, the guide bottom portion 81, the guide side thread portion 42, the guide cylindrical portion 43, and the inside projecting portion 44 are integrally formed. The guide member 80 is movably accommodated in the valve chamber 23, so that the guide member 40 is movable relative to the valve housing 20 in the axial direction.

The guide bottom portion 81 is a disk-shaped portion and is positioned at an axial upper side of the valve member 30 in the valve opening direction. The guide bottom portion 81 is provided so as to be substantially perpendicular to the movement axis A30 of the valve member 30. An end surface 811 on the valve closing direction side of the guide bottom portion 81 supports the end portion of the first coil spring 56 on the valve opening direction side. An end surface 812 of the guide bottom portion 81 on the valve opening direction side supports the end portion of the second coil spring 57 on the valve closing direction side, as shown in FIG. 5. In the present embodiment, the second coil spring 57 is provided so as to be supported by the end surface 812 at a peripheral edge part of the guide bottom portion 81.

Figure 5:
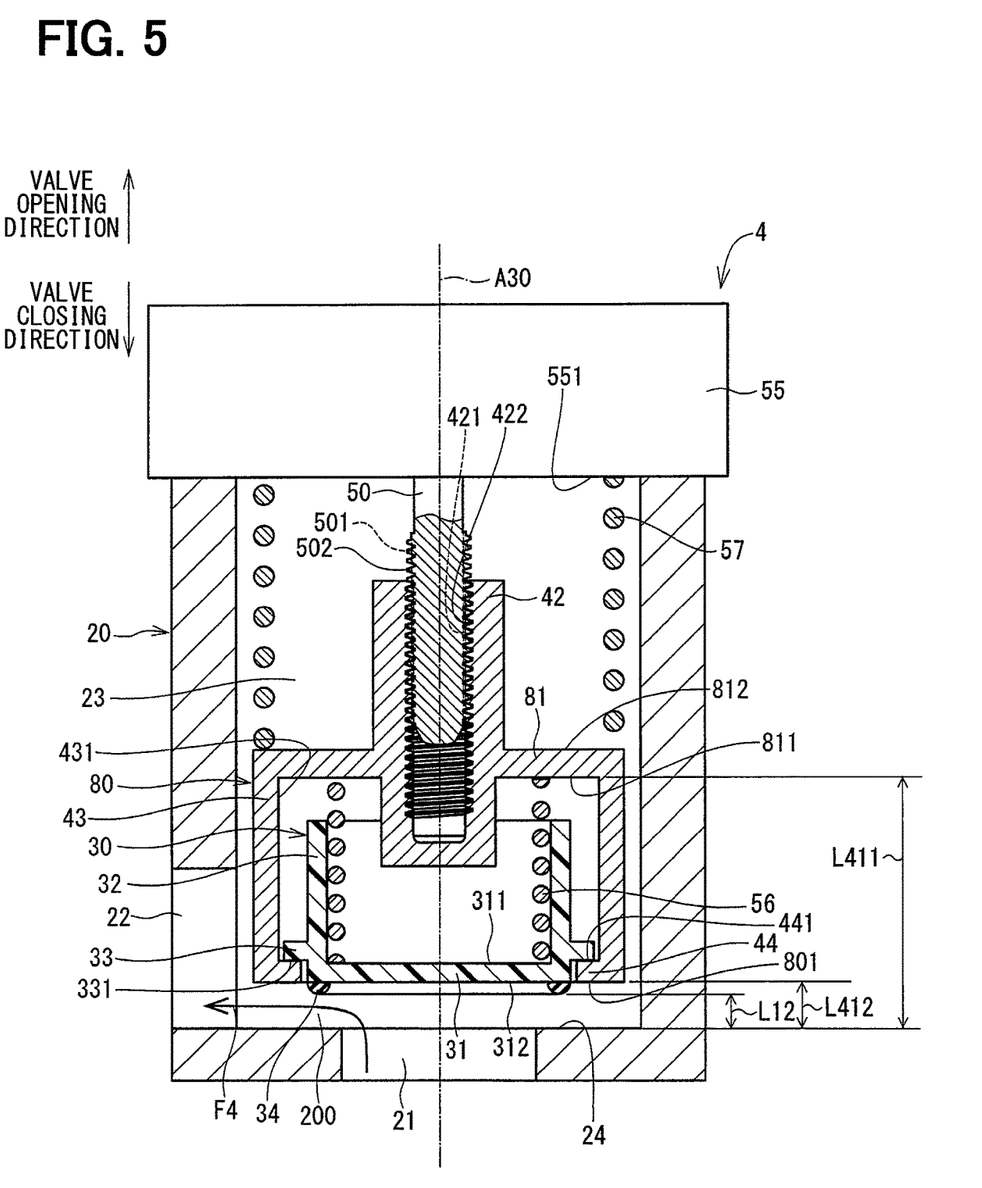
FIG. 5 is a cross-sectional view of a valve device according to a fourth embodiment.

In the valve device 4 in the valve opening state shown in FIG. 5, a distance L411 between the end surface 811 of the guide bottom portion 81 and the valve seat 24 is longer than the distance L12 between the seal portion 34 and the valve seat 24. A distance L412 between an end surface 801 of the guide member 80 on the valve closing direction side and the valve seat 24 is longer than the distance L12 between the seal portion 34 and the valve seat 24.

In the valve device 4 according to the fourth embodiment, the guide bottom portion 81 that supports the end portion of the second coil spring 57 on the valve closing direction side is formed such that the distance L411 between the end surface 811 on the valve closing direction side and the valve seat 24 is longer than the distance L12 between the seal portion 34 and the valve seat 24. The guide member 80 is formed so that the distance L412 between the end surface 801 on the valve closing direction side and the valve seat 24 is longer than the distance L12 between the seal portion 34 and the valve seat 24. As a result, in the fourth embodiment, the fuel vapor flowing from the fuel tank side inlet port 21 toward the canister side outlet port 22 flows smoothly without colliding with the second coil spring 57 and the guide member 80 (see the dotted line F4 in FIG. 5). The same effect as that of the first embodiment is exerted.

In the valve device 4 according to the fourth embodiment, when the guide member 80 is compared with the guide member 40 according to the first embodiment, there is no guide side spring support portion which protrudes radially from the guide cylindrical portion 43. Thereby, in the fourth embodiment, the size of the valve device 4 can be made smaller in comparison with that in the first embodiment.

Fifth Embodiment

Figure 6:
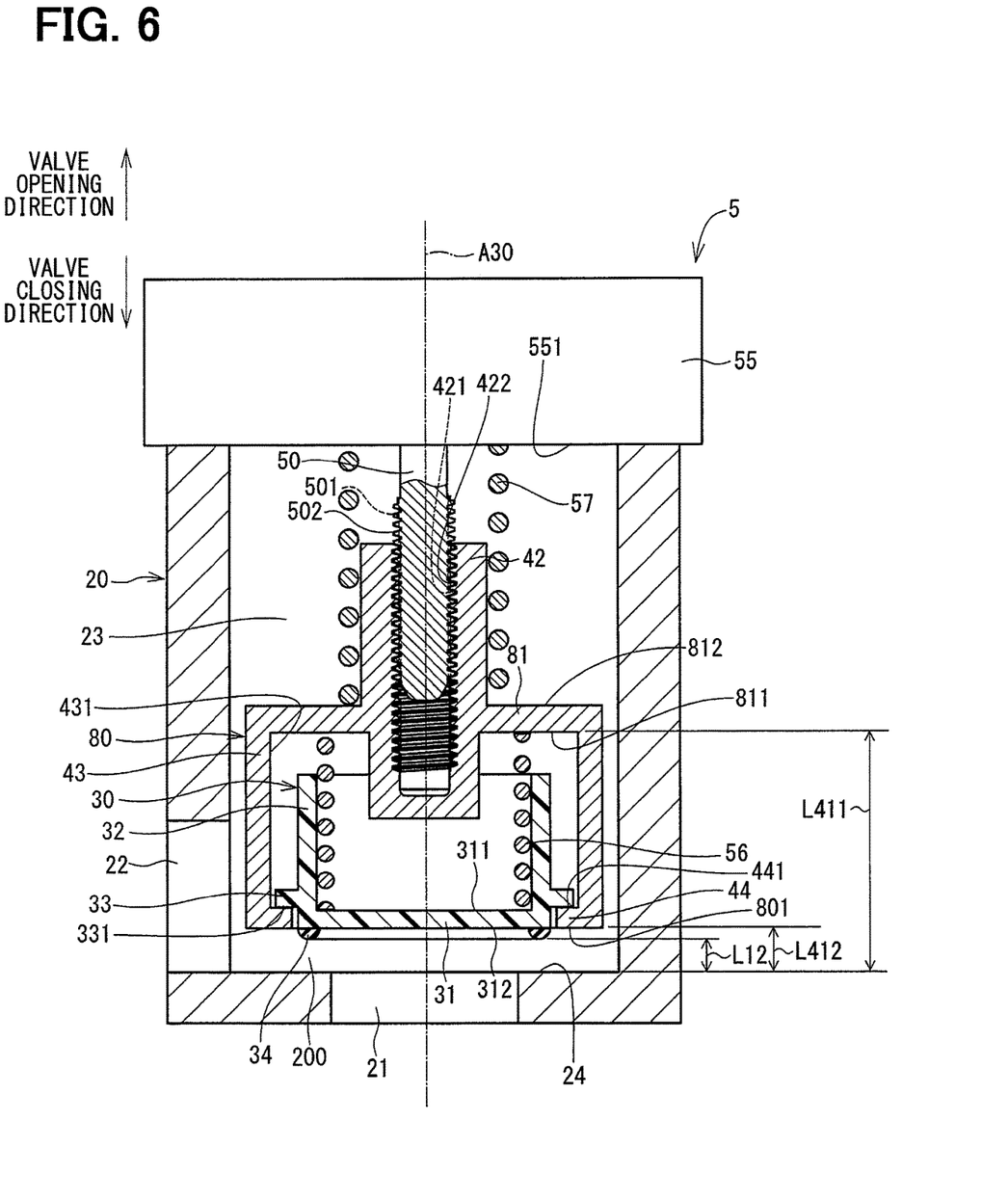
FIG. 6 is a cross-sectional view of a valve device according to a fifth embodiment.

A valve device 5 according to a fifth embodiment of the present disclosure will be explained with reference to FIG. 6. The fifth embodiment is different from the fourth embodiment regarding a position where the "second biasing member" is provided.

The valve device 5 of the fifth embodiment includes the valve housing 20, the valve member 30, the guide member 80, the shaft 50, the electric motor 55, the first coil spring 56, the second coil spring 57 and so on. In the present embodiment, as shown in FIG. 6, the second coil spring 57 is provided so as to be supported in the vicinity of a portion of the end surface 812 of the guide bottom portion 81 connected to the guide side thread portion 42. As a result, the second coil spring 57 expands and contracts along the outer wall surface of the guide side thread portion 42.

In the valve device 5 according to the fifth embodiment, as in the fourth embodiment, the distance L411 between the end surface 811 of the guide bottom portion 81 and the valve seat 24 is longer than the distance L12 between the seal portion 34 and the valve seat 24. The distance L412 between the end surface 801 of the guide member 80 on the valve closing direction side and the valve seat 24 is longer than the distance L12 between the seal portion 34 and the valve seat 24. In this way, the fifth embodiment achieves the advantages that are the same as those of the fourth embodiment.

Sixth Embodiment

A valve device 6 according to the sixth embodiment of the present disclosure will be explained with reference to FIG. 7. The sixth embodiment is different from the first embodiment in the position where the "second biasing member" and the "second biasing member support portion" are provided.

The valve device 6 of the sixth embodiment includes the valve housing 20, the valve member 30, a guide member 90, the shaft 50, the electric motor 55, the first coil spring 56, the second coil spring 57 and so on.

The guide member 90 is the member arranged at the radial outside and the axial upper side position (the valve opening side position) of the valve member 30. The guide member 90 includes a guide bottom portion 81, a guide side thread portion 921 as a "valve member side thread portion", a guide side thread portion cover 922 as a "second biasing member support portion", a lid portion 923, the guide cylindrical portion 43, and the inside projecting portion 44. In the present embodiment, the guide bottom portion 81, the guide side thread portion 921, the guide side thread portion cover 922, the lid portion 923, the guide cylindrical portion 43, and the inside projecting portion 44 are integrally formed. The guide member 90 is movably accommodated in the valve chamber 23, so that the guide member 90 is movable relative to the valve housing 20 in the axial direction.

The guide side thread portion 921 is a cylindrical portion and is provided on the movement axis A30. The guide side thread portion 921 is provided so as to pass through the center of the guide bottom portion 81. The guide side thread portion 921 is formed in a cylindrical shape and has a female thread 925 as a "valve member side thread" on an inner wall surface 924.

The guide side thread portion cover 922 is a tubular portion and is provided on the radially outer side of the guide side thread portion 921. The guide side thread portion cover 922 is connected to the guide bottom portion 81. An end surface 926 of the guide side thread portion cover 922 on the valve opening direction side supports an end portion of the second coil spring 57 on the valve closing direction side.

The lid portion 923 is provided so as to close an opening on the valve closing direction side of the guide side thread portion 921. In the present embodiment, the end surface on the valve closing direction side of the guide side thread portion 921, an end surface 927 on the valve closing direction side of the guide side thread portion cover 922, and an end surface 928 on the valve closing direction side of the lid portion 923 are on the same plane.

Figure 7:
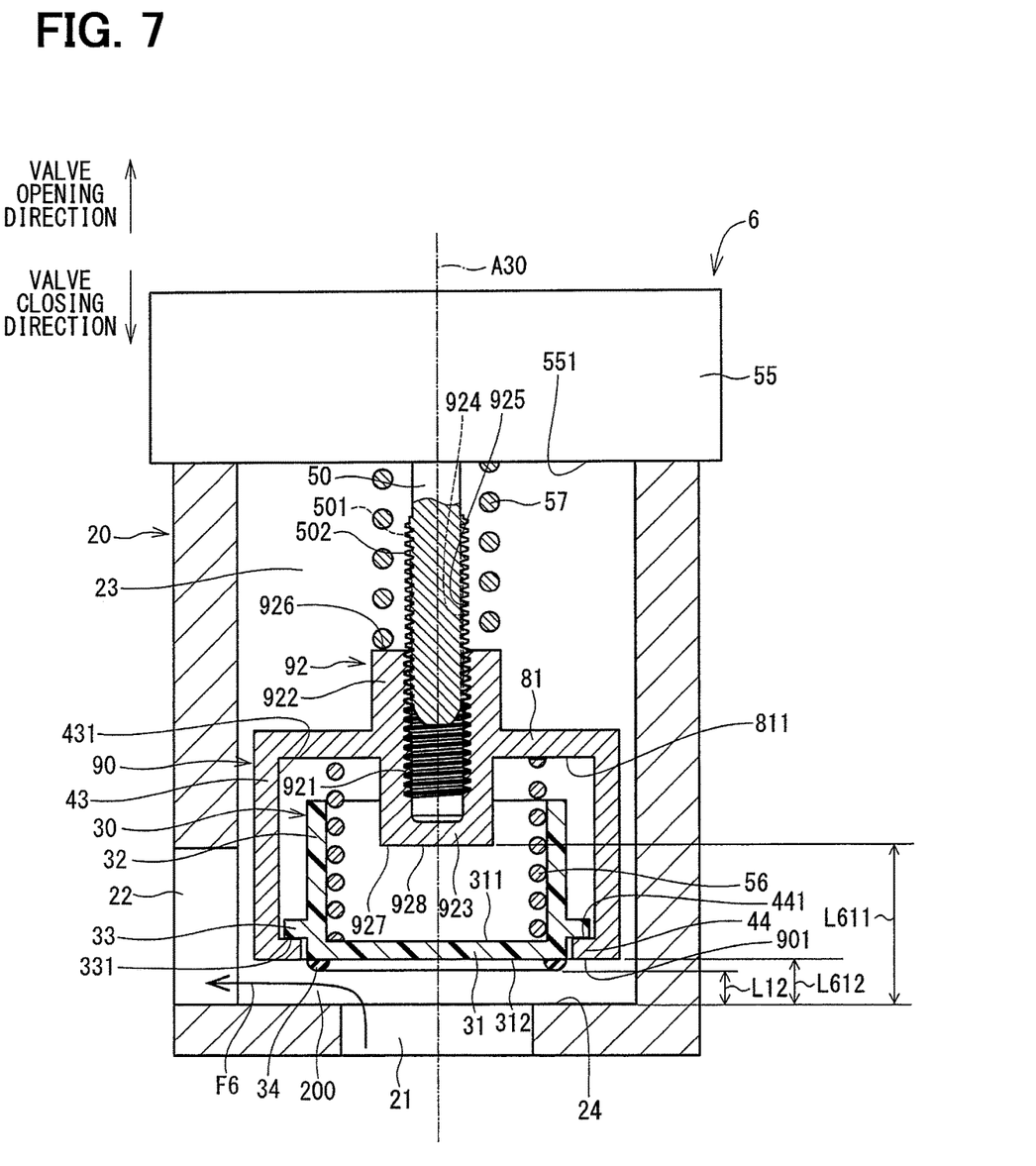
FIG. 7 is a cross-sectional view of a valve device according to a sixth embodiment.

In the valve device 6 in the valve opening state shown in FIG. 7, a distance L611 between the end surface 927 of the guide side thread portion cover 922 and the valve seat 24 is longer than the distance L12 between the seal portion 34 and the valve seat 24. A distance L612 between an end surface 901 of the guide member 90 on the valve closing direction side and the valve seat 24 is longer than the distance L12 between the seal portion 34 and the valve seat 24.

In the valve device 6 according to the sixth embodiment, the guide side thread portion cover 922 that supports the end portion of the second coil spring 57 in the valve closing direction side is formed such that the distance L611 between the end surface 927 and the valve seat 24 is longer than the distance L12 between the seal portion 34 and the valve seat 24. The guide member 90 is formed so that the distance L612 between the end surface 901 on the valve closing direction side and the valve seat 24 is longer than the distance L12 between the seal portion 34 and the valve seat 24. As a result, in the sixth embodiment, the fuel vapor flowing from the fuel tank side inlet port 21 toward the canister side outlet port 22 flows smoothly without colliding with the second coil spring 57 and the guide member 90 (see the dotted line F6 in FIG. 7). The same effect as that of the first embodiment is exerted.

Seventh Embodiment

A valve device 7 according to a seventh embodiment of the present disclosure will be explained with reference to FIG. 8. The seventh embodiment is different from the sixth embodiment in the position where the "second biasing member" and the "second biasing member support portion" are provided.

The valve device 7 of the seventh embodiment includes the valve housing 20, the valve member 30, the guide member 90, the shaft 50, the electric motor 55, the first coil spring 56, the second coil spring 57 and so on. In FIG. 8, a part of the female thread 925 is omitted in order to prevent complication of the drawing.

Figure 8:
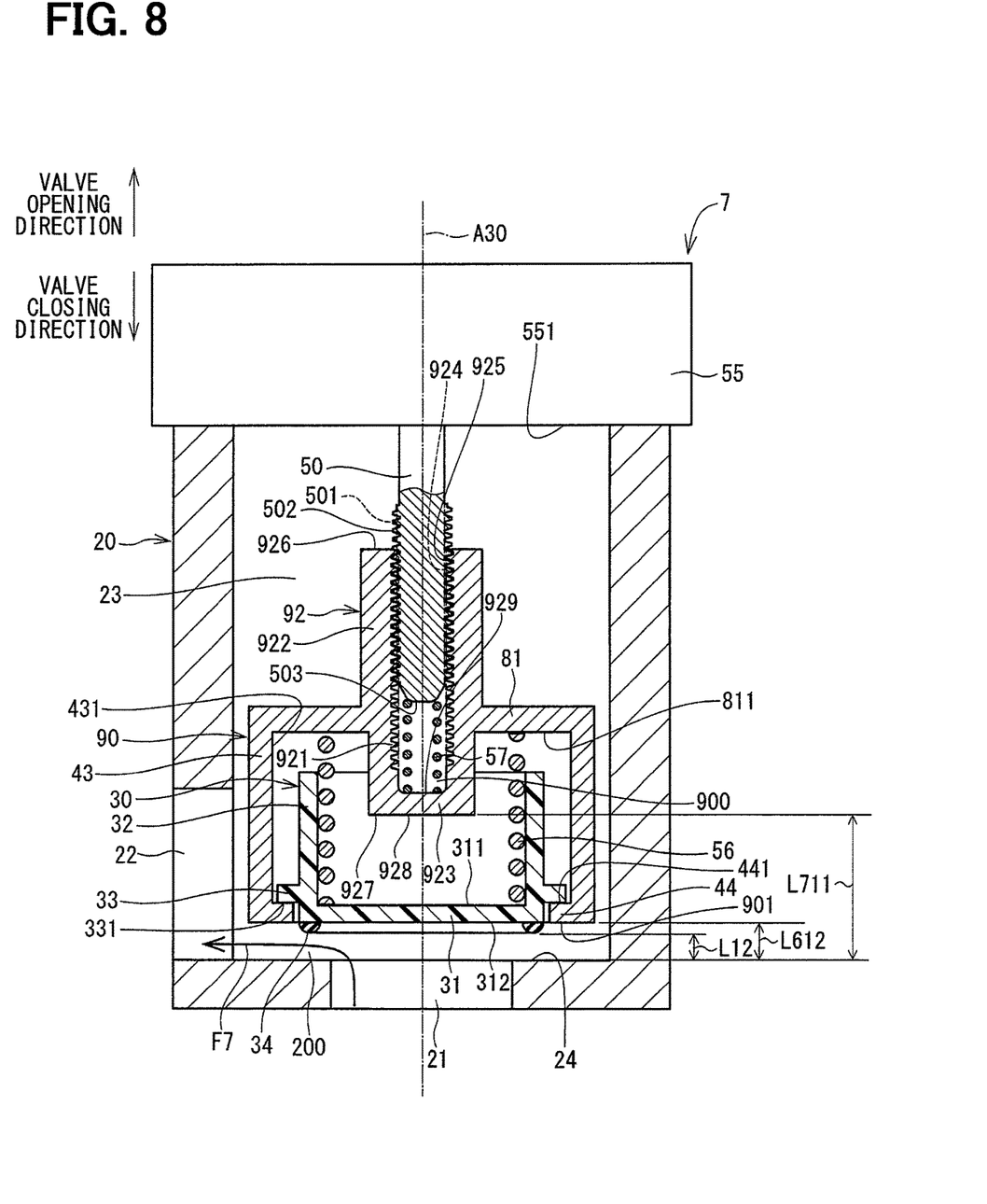
FIG. 8 is a cross-sectional view of a valve device according to a seventh embodiment.

As shown in FIG. 8, the second coil spring 57 is accommodated in a space 900 formed by the guide side thread portion 921, the lid portion 923, and the shaft 50. In the second coil spring 57, the end portion of the second coil spring 57 on the valve closing direction side is supported by an end surface 929 on the valve opening direction side of the lid portion 923 as the "second biasing member support portion". An end portion of the second coil spring 57 on the valve opening direction side is supported by an end surface 503 on the valve closing direction side of the shaft 50.

In the valve device 8 in the valve opening state shown in FIG. 8, a distance L711 between the end surface 928 of the lid portion 923 on the valve closing direction side and the valve seat 24 is longer than the distance L12 between the seal portion 34 and the valve seat 24.

In the valve device 7 according to the seventh embodiment, the lid portion 923 that supports the end portion of the second coil spring 57 in the valve closing direction side is formed such that the distance L711 between the end surface 928 and the valve seat 24 is longer than the distance L12 between the seal portion 34 and the valve seat 24. As a result, in the seventh embodiment, the fuel vapor flowing from the fuel tank side inlet port 21 toward the canister side outlet port 22 flows smoothly without colliding with the second coil spring 57 and the guide member 90 (see the dotted line F7 in FIG. 8). The same effect as that of the first embodiment is exerted.

In the valve device 7 according to the seventh embodiment, since the second coil spring 57 is accommodated in the space 900, the second coil spring 57 suppresses contact with fuel vapor drifting in the valve chamber 23. Thus, in the seventh embodiment, the deterioration of the second coil spring 57 due to the fuel vapor can be prevented.

Eighth Embodiment

Figure 9:
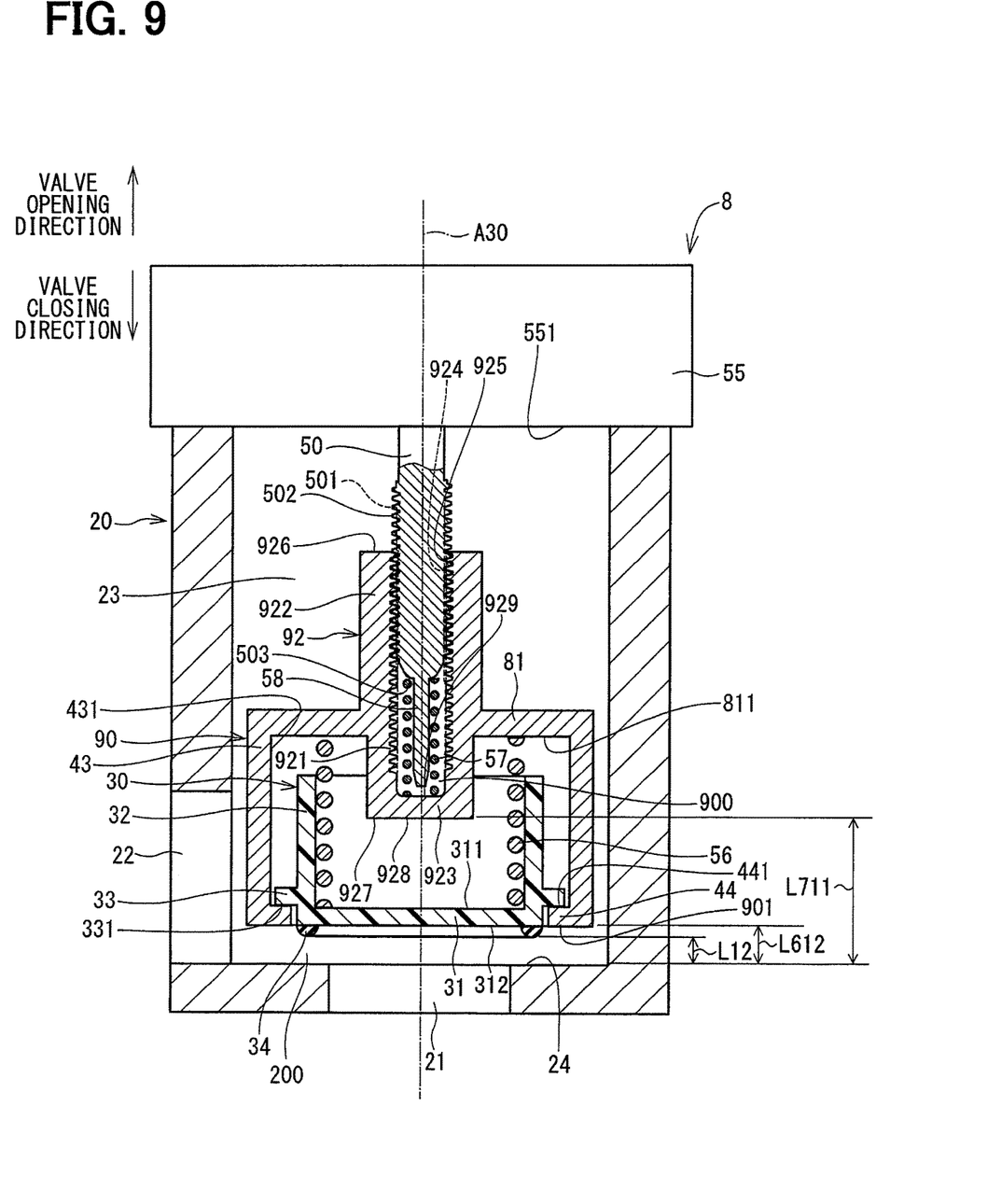
FIG. 9 is a cross-sectional view of a valve device according to an eighth embodiment.

A valve device 8 according to an eighth embodiment of the present disclosure will be explained with reference to FIG. 9. The eighth embodiment is different from the seventh embodiment in that a guide portion is provided.

The valve device 8 according to the eighth embodiment includes the valve housing 20, the valve member 30, the guide member 90, the shaft 50, the electric motor 55, the first coil spring 56, the second coil spring 57 accommodated in the space 900, and a spring guide portion 58 as an "second biasing member guide portion". In FIG. 9, a part of the female thread 925 is omitted in order to prevent complication of the drawing.

The spring guide portion 58 is provided on the end surface 503 of the shaft 50. The spring guide portion 58 is formed so as to protrude from the end surface 503 in the valve closing direction. The spring guide portion 58 is positioned in the radially inward direction of the second coil spring 57.

In the valve device 8 according to the eighth embodiment, as in the seventh embodiment, the lid portion 923 for supporting the end portion of the second coil spring 57 on the valve closing direction side is formed such that the distance L711 between the end surface 928 and the valve seat 24 is longer than the distance L12 between the seal portion 34 and the valve seat 24. In this way, the eighth embodiment achieves the advantages that are the same as those of the seventh embodiment.

In addition, in the valve device 8 according to the eighth embodiment, expansion and contraction of the second coil spring 57 is guided by the spring guide portion 58. Thereby, it is possible to suppress interference between the female thread 925 of the guide side thread portion 921 and the second coil spring 57. Therefore, in the eighth embodiment, breakage of the second coil spring 57 can be prevented and durability thereof can be improved.

Other Embodiments

In the above embodiments, it was assumed that the valve device is applied to the evaporated fuel processing system. However, the system to which the valve device is applied is not limited to the above system. It may be applied to a system for controlling the flow of fluid.

In the embodiment described above, the guide member has the guide cylindrical portion which is a cylindrical portion provided at the radially outer end portion of the guide bottom portion. However, the guide cylindrical portion may not be provided. The guide member may have "valve member side thread portion", "engaging portion", and "second biasing member support portion".

In the first to sixth embodiments, it is assumed that the guide member has the female thread and the shaft has the male thread. However, the guide member may have the male thread and the shaft may have the female thread.

In the second embodiment, the guide side spring support portion is provided substantially at the center of the guide cylindrical portion in the direction along the movement axis of the valve member. However, the position at which the guide side spring support portion is provided is not limited to the above position. the position at which the guide side spring support portion is provided may be in the valve closing direction from the approximate center of the guide cylindrical portion or in the valve opening direction from that of the guide cylindrical portion.

In the third embodiment, the end surface on the valve opening direction side is formed so as to be separated from the inner wall surface of the valve housing flush with the valve seat at a fixed rate as the end surface goes away from the fuel tank side inlet port. However, the shape of the end surface on the valve opening direction side is not limited to the above shape. For example, the shape of the end surface may be curved so that the rate of separating from the valve seat increases as the end surface goes away from the fuel tank side inlet port.

The present disclosure should not be limited to the embodiments described above, and various other embodiments may be implemented without departing from the scope of the present disclosure.

In the valve device of the present disclosure, the second biasing member support portion supporting the end portion on the valve seat side of the second biasing member is formed such that the distance between the second biasing member support portion and the valve seat is longer than the distance between the valve member and the valve seat. As a result, the gas flowing from the first through hole formed on the moving shaft of the valve member toward the second through hole formed in the radially outward direction of the valve member flows without collision of the second biasing member support portion, therefore, the pressure loss of the fluid flowing from the first through hole to the second through hole can be reduced. In the valve device of the present disclosure, it is possible to flow a relatively large flow rate of fluid with a relatively small amount of movement of the valve member, so that controllability can be improved.

What is claimed is:

1. A valve device, comprising:
   a valve housing including a plurality of through holes through which a fluid flows, a valve seat formed around the first through hole of the plurality of through holes, and a valve chamber configured to communicate the plurality of through holes;
   a valve member provided so as to reciprocate in the valve chamber, and having an one end portion, wherein when the one end portion is separated from the valve seat, the first through hole and the second through hole of the plurality of through holes are communicated, and when the one end portion comes into contact with the valve seat, the communication between the first through hole and the second through hole is blocked;
   an engaging portion provided in the valve chamber in a radially outward direction of the valve member, and being configured to engage with an end surface on the valve seat side of the valve member;
   a valve member side thread portion provided so as to be movable integrally with the engaging portion and having a valve member side thread;
   a driving portion side thread portion having a driving portion side thread screwed with the valve member side thread;
   a driving portion configured to rotate the driving portion side thread portion;
   a first biasing member configured to bias the valve member so that the valve member comes into contact with the valve seat;
   a second biasing member configured to bias the engaging portion in a direction approaching the valve seat; and
   a second biasing member support portion that is movably provided integrally with the valve member side thread portion and supports the end portion on the valve seat side of the second biasing member; wherein
   the first through hole is formed on a movement axis of the valve member,
   the second through hole is formed in a radially outward direction of the valve member, and
   a distance between the second biasing member support portion and the valve seat is longer than a distance between the valve member and the valve seat.

2. The valve device according to claim 1, wherein the second biasing member support portion is provided in a radially outward direction of the engaging portion.

3. The valve device according to claim 2, wherein an end surface of the second biasing member support portion on the valve seat side is formed to be away from the valve seat as the end surface goes away from the first through hole.

4. The valve device according to claim 1, wherein the second biasing member support portion is provided on an opposite side of the engaging portion with respect to the valve seat.

5. The valve device according to claim 1, wherein the second biasing member is supported on an end surface of the valve member side thread portion opposite to the valve seat.

6. The valve device according to claim 1, wherein the valve member side thread portion is formed in a cylindrical shape, and has a female thread as the valve member side thread,
   the driving portion side thread portion is formed in a bar shape, and has a male thread as the driving portion side thread, and
   the second biasing member is accommodated in a space formed by the valve member side thread portion and the driving portion side thread portion.

7. The valve device according to claim 6, wherein the driving portion side thread portion has a second biasing member guide portion, and
   the seat biasing member guide portion is provided on the valve seat side of the driving portion side thread portion and positioned in a radially inward direction of the second biasing member so as to guide expansion and contraction of the second biasing member.

* * * * *